Feb. 20, 1968  R. KAUFFMANN  3,369,624
PARACHUTABLE, SELF-PROPELLED ENDLESS TRACK VEHICLE
Filed March 1, 1966  3 Sheets-Sheet 2
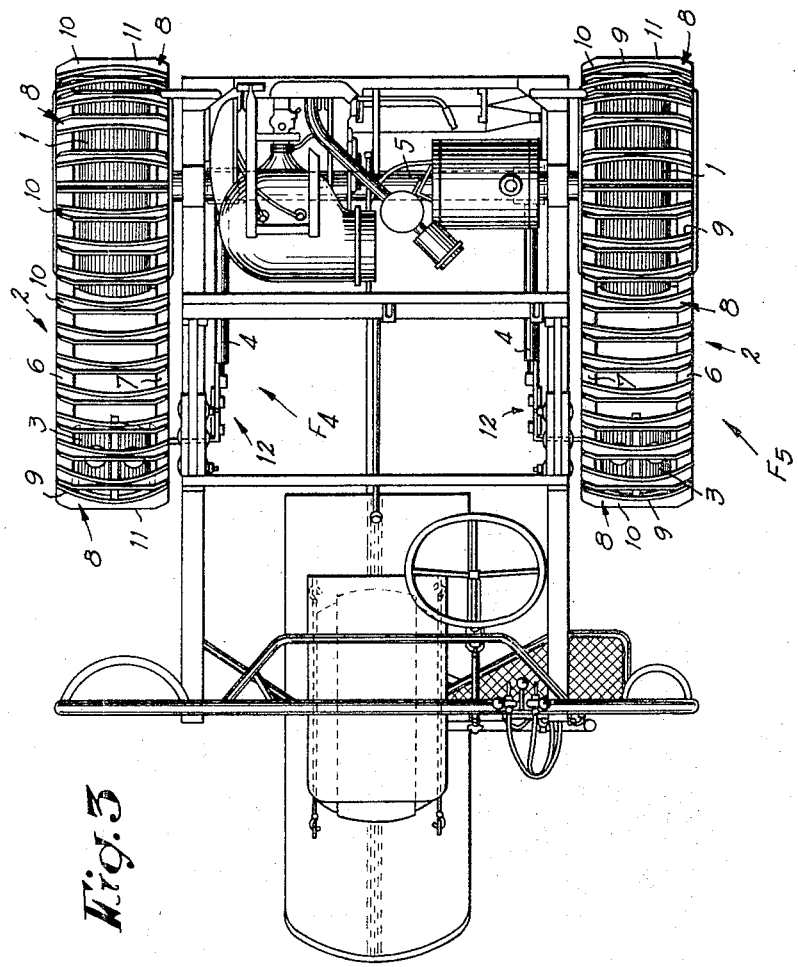

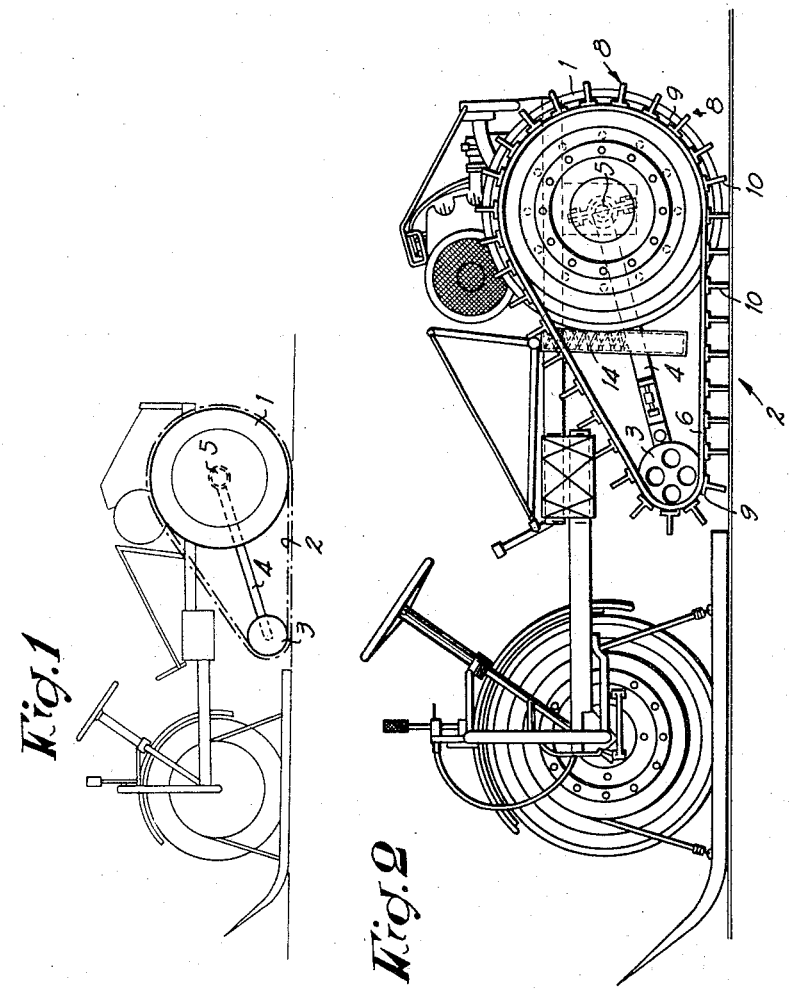

United States Patent Office 3,369,624
Patented Feb. 20, 1968

3,369,624
PARACHUTABLE, SELF-PROPELLED ENDLESS
TRACK VEHICLE
Raymond Kauffmann, Oupeye, Belgium, assignor to
Fabrique Nationale d'Armes de Guerre, Societe
Anonyme, Herstal-Lez-Liege, Belgium, a company
Filed Mar. 1, 1966, Ser. No. 530,926
Claims priority, application Belgium, Mar. 17, 1965,
661,220
5 Claims. (Cl. 180—9.54)

ABSTRACT OF THE DISCLOSURE

A vehicle capable of driving upon deep snow or sand has driving wheels each of which has an endless band provided with scrapers and passing over a drum located forwardly of the wheel and swingable about the wheel axle, the scrapers having wings corresponding to the wheel tire.

This invention relates to parachutable self-propelled vehicles of the type essentially incorporating a single-wheel front-axle assembly with two spar elements, a two-wheeled back-axle assembly with two spar elements, a power unit and, between these front and back-axle assemblies, connecting means for corresponding spar elements, wherein in order to obtain a vehicle capable of seating four front-facing occupants, the vehicle consists substantially of a combination of a front-axle assembly, forming a tubular framework almost of the same width as the back-axle assembly, a rear-wheel assembly supporting, for example, a single folding seat extending practically over the entire width of said rear axle assembly, and, between each pair of overlapping spar elements, removable connecting means.

Although such vehicles have remarkable performances, even in cross country operation, the demands upon them become more and more severe, both in civilian and military uses.

The problem to which the present invention refers, concerns more particularly the travelling of the vehicle on a soil which, down to a considerable depth, has practically no resistance. Such soil is for instance encountered in places covered with deep or even very deep snow, on which said vehicle may be compelled to travel, even at high speed.

Numerous tests performed before reaching the solution disclosed in the present application have shown that the difficulties were of course mainly due to the lack of resistance of the soil for supporting the vehicle, but also and principally to the clogging of parts coming into contact with such soil.

These difficulties are overcome, according to this invention, by a parachutable self-propelled vehicle of the type essentially incorporating a single-wheel front-axle assembly, forming a tubular framework almost of the same width as the back-axle assembly, a two wheel back-axle assembly supporting a single folding seat extending practically over the entire width of said rear axle assembly, and an equipment operating with each one of the driving wheels and comprising substantially an endless open-work band with scrapers, resting on the one hand on a driving wheel and, on the other hand, on a countershaft drum or roller situated in the forward direction of the vehicle and mounted on an elastically hinged lever and urged toward the soil.

The counter-shaft drums or rollers have a diameter which is considerably smaller than that of the rear driving wheels in order to provide the largest possible angular separation of the cross-pieces of said open-work endless band for promoting their unclogging, loosening and evacuating the material, which in the present instance happens to be snow, normally held between the successive cross-pieces of said band.

The band in question is, preferably, embodied by two endless bands or belts of an elastic natural or synthetic high-resistant material, mutually connected by a succession of equidistant cross-pieces shaped so as to form transverse scrapers of appropriate shape and dimensions.

Along the rectilinear sections of this open-work endless band, between the points of tangency of the rear wheel and of the counter-shaft drum or roller, the scrapers are parallel, whereas they are divergent in their curved part.

The cross-scrapers have, preferably, a T-shaped cross-section of which the web forms the actual scraper whereas the wings are, by their extremities, connected to said belts or marginal elastic bands.

These characteristic features may of course be embodied under considerably variable forms, depending on the form of the open-work endless scraper band, the design of the tires fitting the driving wheels of the vehicle, the shape of the counter-shaft drum or roller, the disposition of the rocker arm with its elastic return hub and its stops, as well as all accessory elements belonging to such kind of equipment.

Hence, it is without implying any limiting nature, that a preferred description thereof is given below in greater detail with reference to the appended drawings, of which:

FIGURE 1 illustrates in a very diagrammatic way, and as a side view, a vehicle of the type provided with an equipment conforming to the present invention;

FIGURE 2 is a side view of a practical embodiment represented diagrammatically in FIGURE 1;

FIGURE 3 is a plan view of the embodiment illustrated in FIGURE 2;

Figure 4:
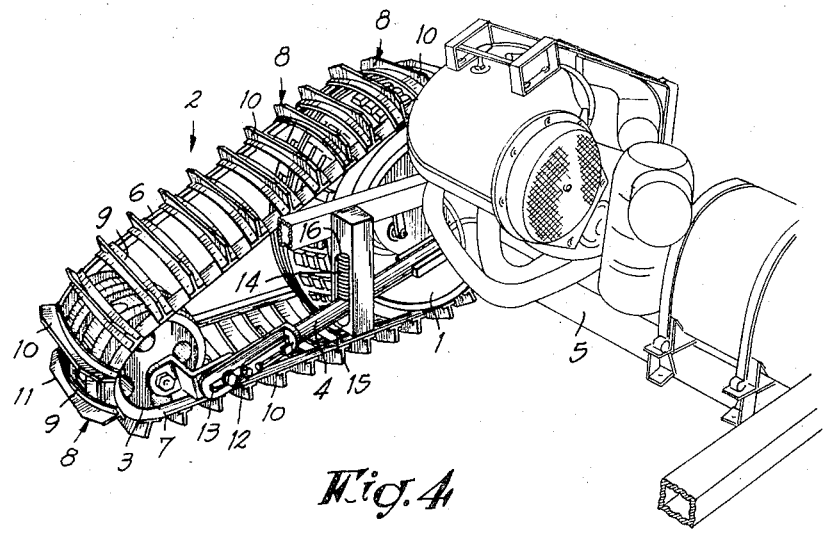
FIGURE 4 is a partial perspective view in the direction of arrow F4 of FIGURE 3.

The characteristic equipment conforming to the present invention substantially consists in the combination, with each one of the driving wheels 1, of an open-work endless scraper band 2 mounted, in direction of the forward part of the vehicle, on a counter-shaft drum or roller 3 mounted at the end of an arm 4 swinging about the rear axis 5. Each one of the two driving wheels is provided with such equipment.

Figure 5:
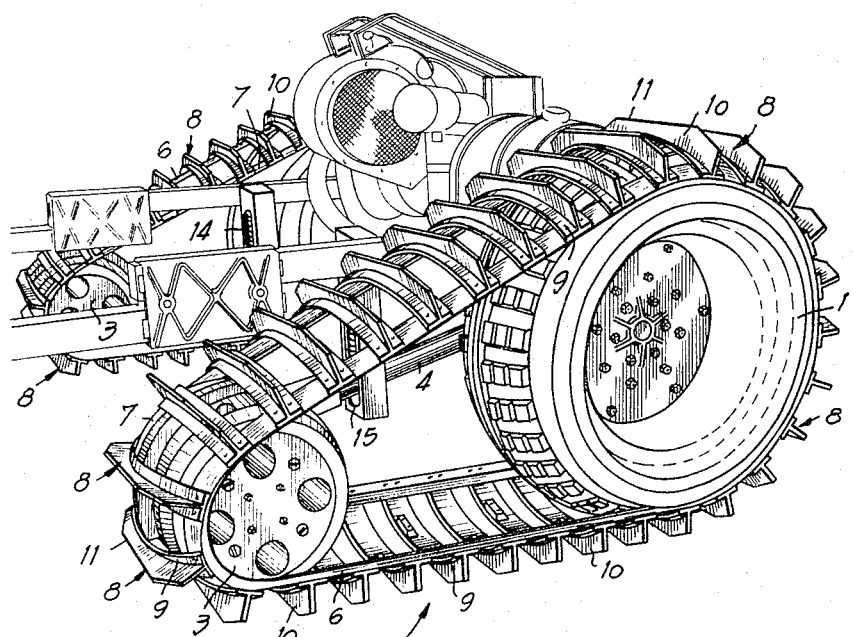
FIGURE 5 is a partial perspective view in the direction of arrow F5 of FIGURE 3.

In the embodiment of FIGURES 2 to 5, the open-work endless band 2 consists of two endless belts or bands 6–7 connected by equidistant cross-pieces 8. The latter have a T-shaped cross-section of which the wings form an arcuate base 9 the radius of curvature of which is nearly equal to that of the tires mounted on the driving wheels. The webs 10 of said T-shaped cross-pieces forming the actual scrapers are mounted at right angles to said endless bands 6–7. The webs 10 are shaped so as to have a straight upper edge 11 so that, in the rectilinear section of said open-work endless band, said straight edges 11 of all transverse scrapers are disposed in the same plane, parallel to that which is determined by said marginal bands 6–7. The counter-shaft drum or roller 3 has a diameter which is considerably smaller than that of the driving wheels, which brings about successively a marked converging arrangement of all scrapers thus promoting the release of the snow which is inevitably pinched between successive scrapers. Another effect of this arrangement is that of bringing, at the instant of contact with the soft surface, the scrapers in a position of maximum divergency so that, when they eventually come to be seated, they have compressed already the snow between them, thus preparing it for undergoing a higher and higher pressure up to the driving wheel 1. The only object of the forward position of drum or roller 3 and of its comparatively small diameter is to enable a gradual compression of the snow to take place so that it might, when passing over the driving wheel, resume the longitudinal stress.

Preferably, this counter-shaft drum or roller 3 is hollow and has open-work walls so as to promote still more the release of the clogging material. The countershaft drum or roller 3 is mounted at the extremity of the arm 4 rocking about the rear axle 5. In the present instance, this arm is made of two parts connected to tightening elements shown diagrammatically in 12, whereby the connection between these two constituent parts of arm 4 is such that the length of the latter is variable and adjustable, so as to provide the correct tension of the open-work endless scraper band 2. With this object in view, aforesaid tightening and fixing device 12 is engaged in an elongated opening 13 of one of the constituent parts of said arm 4. Downwardly extending guide members for the arms 4 are attached to each rear spar or frame member. Each guide member comprises an elongated vertically oriented slot having end stops 15 and 16 and a spring 14 to urge the arm 4 downwardly.

The design of the countershaft drum or roller 3 should follow the shape of the tire mounted over the driving wheel, considering that it is desirable that its curvature be practically the same as that of the rolling area of the latter. In a preferred embodiment, said countershaft drum or roller 3, as well as its endless open-work scraper band 2 are designed in accordance with the tire mounted on said rear driving wheels 1 and more particularly with respect to the pattern thereof. As a matter of fact, this type of vehicle such as is manufactured by applicant, is equipped with special tires essentially characterized by two rather deep peripheral grooves, limited externally by peripheral beads which form at the same time a systematic retaining and positive guiding device of said endless open-work scraper band 2. Outside, the countershaft drum or roller 3 is also designed so as to afford a solid support for said endless belts or bands 6-7, respectively for the whole of the endless open-work scraper band 2.

One of the main features of the present invention is to be found in the combination between such kind of tire and such kind of endless open-work scraper band, this combination being completed by the countershaft drum or roller in question mounted in the front direction of the vehicle and at the end of a rocker arm.

A vehicle belonging to the type described hereabove and provided with such kind of equipment has given surprising results on soil covered with 60 to 100 cm. of heavy snow, the propulsion of the vehicle being comparatively normal and the unclogging of the free spaces between scrapers of the endless open-worked band 2 proving altogether satisfactory.

This invention concerns an equipment considered by itself to be a novel industrial product which can be applied to the rear driving wheels of a vehicle, more particularly of vehicles of the type which has been described, as well as vehicles the driving wheels of which have been supplied with such equipment.

What I claim is:

1. In a parachutable self-propelled vehicle having spaced side frame members, a rear axle carried by said frame and two driving wheels carried by said axle, a separate drive for each driving wheel, said drive comprising an endless band enclosing said wheel, a drum located forwardly of said wheel, said band extending over said drum, an arm of variable length swingably mounted upon said rear axle, said drum being mounted upon said arm, a tightening and fixing device connected with said arm, a downwardly extending guide member attached to each vehicle side frame, each guide member comprising an elongated vertically oriented slot with said arm extending therethrough and limited in vertical movement by the ends of said slot, spring means in said guide members urging said arms downwardly, said endless band comprising two parallel band elements and equidistant cross pieces interconnecting said band elements, each of said cross pieces constituting a scraper of T-shaped cross section.

2. A drive in accordance with claim 1, wherein said drum is hollow and has openings extending therethrough.

3. A drive in accordance with claim 1, comprising a separate tire carried by each wheel, and wherein each of said scrapers has wings having a curvature which is substantially the same as that of the tire.

4. A drive in accordance with claim 3, wherein each of said scrapers has a rectilinear central edge, the central edges of said scrapers extending in planes parallel to those of said band.

5. A drive in accordance with claim 3, wherein said tire has peripheral grooves and beads adjacent said grooves, said scrapers being guided in said grooves.

References Cited

UNITED STATES PATENTS

| 2,618,349 | 11/1952 | Ludema | 180—9.38 |
| 3,004,619 | 10/1961 | Straussler | 180—27 |

FOREIGN PATENTS

| 610,777 | 12/1960 | Canada. |
| 687,438 | 2/1953 | Great Britain. |

OTHER REFERENCES

Savage, a Foreign Vehicle Dev., Automotive Industries, page 64, vol. 129, No. 11, December 1963.

RICHARD J. JOHNSON, *Primary Examiner.*